United States Patent [19]

Denk

[11] 3,839,735

[45] Oct. 1, 1974

[54] TRANSDUCER HEAD POSITIONING DEVICE

[75] Inventor: Joseph P. Denk, Newark, Calif.

[73] Assignee: Newell Industries Inc., Sunnyvale, Calif.

[22] Filed: Oct. 13, 1972

[21] Appl. No.: 297,181

[52] U.S. Cl. .......... 360/106
[51] Int. Cl. .......... G11b 21/08
[58] Field of Search .......... 274/4 A; 74/128, 111; 360/78, 106; 179/100.2 CA

[56] References Cited

UNITED STATES PATENTS

| | | | |
|---|---|---|---|
| 3,450,409 | 6/1969 | Pitzer | 274/4 A |
| 3,538,779 | 11/1970 | Yamamoto | 74/128 |
| 3,636,782 | 1/1972 | Huber | 274/4 A |
| 3,697,084 | 10/1972 | Ban | 274/4 A |

*Primary Examiner*—Bernard Konick
*Assistant Examiner*—David K. Moore
*Attorney, Agent, or Firm*—Flehr, Hohbach, Test, Albritton & Herbert

[57] ABSTRACT

A positioning device for disposing a transducer to each of a series of transducing positions relative to a record medium includes a transducer support member movable between advanced and retracted positions for moving the transducer therewith. A cam follower element is carried by the support member whereby a rotatable cam, movable to a plurality of discrete positions relative to the follower element, engages the follower element for positioning the transducer in relation thereto. A drive means serves to rotate the cam and includes a star wheel having a plurality of detents or teeth extending therefrom. An actuator moves between advanced and retracted positions for engaging one of the detents and thereby rotates the drive means during movement of the actuator towards the advanced position. The actuator engages another of the detents when moved in the reverse direction so as to continue rotation of the drive means and hence rotation of the cam.

4 Claims, 8 Drawing Figures

TRANSDUCER HEAD POSITIONING DEVICE

BACKGROUND OF THE INVENTION

This invention pertains to positioning devices and is particularly useful in positioning a magnetic transducer relative to one of a number of record paths or tracks defined along a record medium, such as a flexible magnetic tape, disc, or the like. The device described herein is particularly useful in shifting a transducer from one pair of stereo record tracks to another in tape transport apparatus of the type referred to as eight-track cartridge players or the like.

In apparatus of the kind described for playing magnetic record tape wherein four pairs of tracks are transduced along the tape in pairs so as to provide reproduction of prerecorded information on a stereophonic basis, it has been required that the magnetic transducer head be accurately disposed relative to the tracks so that at the end of the playing of a tape in one direction the head can be stepped to a new setting and the program continued while the tape is played in a reverse direction.

From the foregoing it will be readily evident that if the tape is reversed and the transducer repositioned to a new pair of record paths and this repositioning or stepping of the head is inaccurately done the program then played as the tape moves in the reverse direction will not be a continuation of the program reproduced during the forward feeding of the tape.

Accordingly, it is readily evident that the positioning of the transducer must be accomplished with relative reliability, accuracy and, in a commercial product, with limited expense.

Accordingly, there has long been a need for an improved transducer positioning device of the kind described herein.

SUMMARY OF THE INVENTION AND OBJECTS

In general, there has been provided a positioning device for disposing a transducer to each of a series of transducing positions relative to a record medium. The device includes, in general, a transport support member movable between advanced and retracted positions to carry the transducer therewith between various transducing positions defined along the record medium. A cam follower element is also carried by the support member and a cam is rotatable to a plurality of discrete positions relative to the follower element and engages the follower element for positioning the transducer in relation thereto. A drive means for rotating the cam includes a plurality of detents or teeth extending therefrom. An actuator moves between advanced and retracted positions for engaging one of the detents and rotating the drive means during a part of movement of the actuator towards its advanced position. The actuator further engages another of the detents to continue rotation of the drive means during reverse movement of the actuator towards its retracted position.

In general, it is an object of the present invention to provide an improved positioning device suitable primarily for positioning a transducer relative to a number of tracks defined along a moving magnetic record medium such as a magnetic tape.

It is another object of the present invention to provide a transducer positioning device of considerable reliability and accuracy in positioning a transducer by means having the accuracy of a cam surface.

It is a further object of the invention to provide a transducer positioning construction at minimum cost and expense.

The foregoing and other objects of the invention will become more readily evident from the following detailed description of a preferred embodiment when considered in conjunction with the accompanying drawings.

DETAILED DESCRIPTION OF A PREFERRED EMBODIMENT

Figures 1, 2, 3:
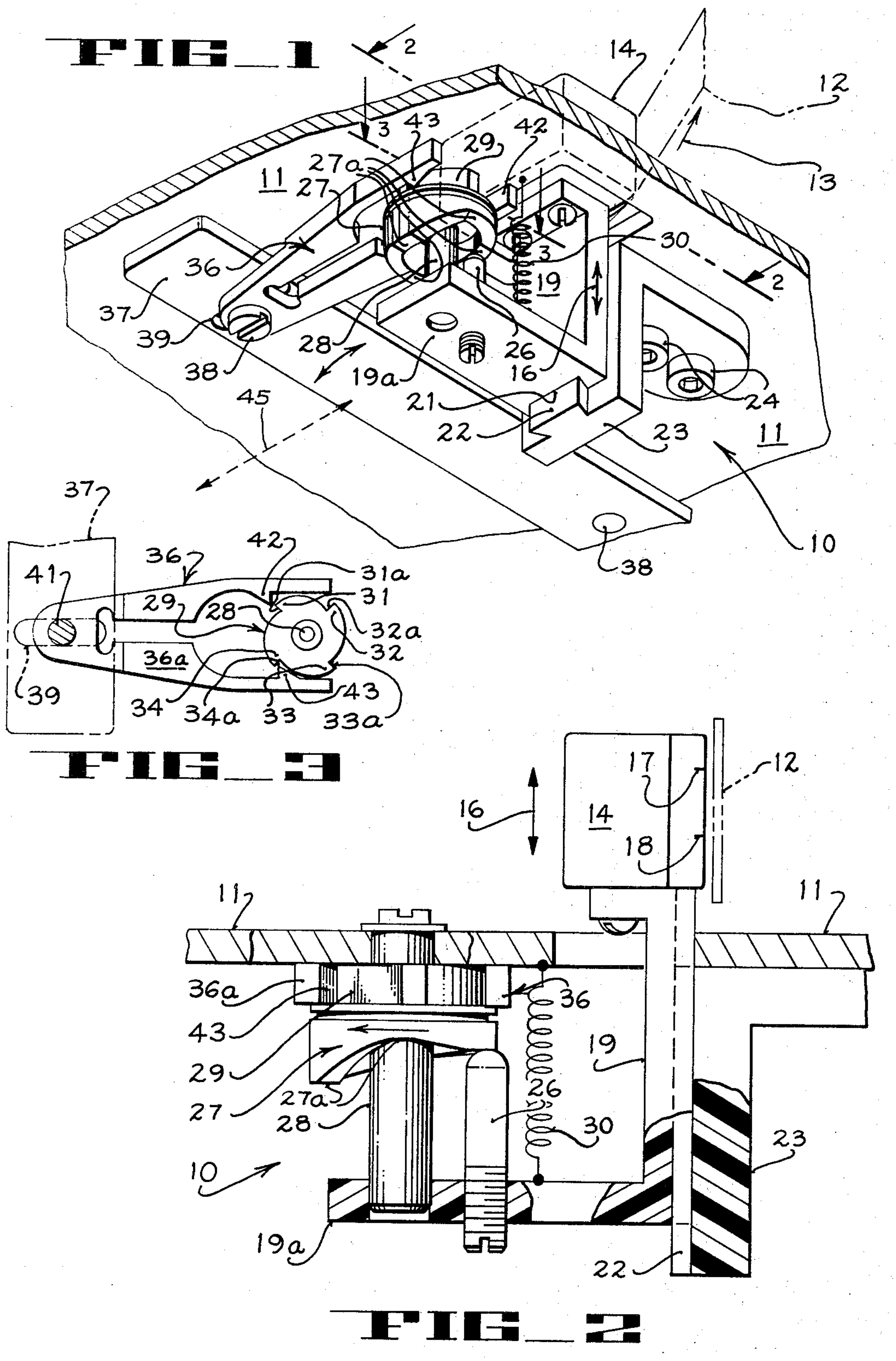
FIG. 1 shows a diagrammatic perspective view, as seen from below, of a transducer positioning device according to the invention.
FIG. 2 shows a diagrammatic elevation view partly in section taken along the line 2—2 of FIG. 1.
FIG. 3 shows a diagrammatic plan view of a detail of the structure shown in FIG. 1 and taken along the line 3—3 of FIG. 1.

A transducer positioning assembly 10 as shown in FIG. 1 is disposed beneath the deck 11 of a tape transport apparatus suitable for advancing a magnetic record tape 12 from a supply roll to a take-up roll and reversely feeding the tape from the take-up roll back to the supply roll. Thus, as the magnetic tape 12 moves in the forward direction (or arrow 13) or in a direction reverse thereto, a magnetic recording or playback transducer 14 can be moved by assembly 10 between advanced and retracted positions as indicated by the arrow 16. Head 14, as used in a so-called "eight-track" stereo player includes a pair of tiny slits 17, 18 exposing a transducer element therethrough to cooperate with tape 12.

An "L" shaped transducer support member 19 or bracket carries transducer 14 and is arranged to move between advanced and retracted positions so as to position transducer 14.

Thus, the back surface of member 19 includes a groove 21 slidably mounted to move along a tongue 22 formed on the face of an inverted "L" shaped bracket 23. Bracket 23 is secured by means of the Allen screws 24 to the underside of deck 11.

A cam follower element in the form of the post 26 is threadedly engaged and adjustable to be carried from the projecting lateral arm 19*a* of support member 19.

The rounded upper end of post 26 rides against the cam surface of a face cam 27 rotatably journaled between arm 19a and deck 11 by means of the axle 28. Cam 27 is secured fast to axle 28 and rotates therewith.

As thus arranged, cam 27 rotates to a number of discrete positions defined by the flats 27*a* formed on the face cam 27 and serving to define one of a number of positions of transducer 14. Fine adjustment in the positioning of slits 17, 18 is easily achieved by advancing or retracting post 26 by means of its threads. A bias spring 30 maintains post 26 against cam 27.

A drive means now to be described serves to rotate cam 27 from one position to the next and, as arranged herein, the rotation is accomplished step-wise one-quarter turn at a time. Further, while the activating movement may be relatively coarse, the drive means, as arranged, serves to provide a relatively precise positioning of the transducer 14.

Thus, the arrangement disclosed is particularly suitable for recording on and playing back from an eight-track tape format wherein the tape is fed first in one direction with transducer slits 17, 18 disposed, for example, to cooperate with tracks one and five to provide a stereophonic effect until the tape has been fed entirely from the supply roll.

Upon re-feeding the tape in a reverse direction transducer 14 is moved one step as the tape material is reversed so as to align slits 17, 18 with tracks 2 and 6. Ultimately the tape will have been fed entirely from the take-up roll back to the supply roll while transducer 14 cooperates with the tape to reproduce the program recorded in tracks 2 and 6. After the tape has been fully wound upon the supply roll the tape can then be reversed again and re-fed to the take-up roll while transducer 14 is shifted again so that slits 17, 18 cooperate with tracks 3 and 7. The next reverse feeding of tape will ultimately require the disposition of slits 17, 18 respectively with tracks 4 and 8.

Means for stepping or rotating cam 27 includes a star wheel 29 formed also to rotate with the rotation of axle 28 and cam 27. Star wheel 29 includes a plurality of four lobes 31–34 each of which commences as a gradual radially outwardly spiraling cam surface which then terminates abruptly in a sharp detent surface **31*a*–34*a***, referred to hereinafter simply as a detent.

A bifurcated or fork-like actuator 36 comprising a pair of spaced leaf members resiliently urged toward each other for engaging the periphery of star wheel 29 therebetween moves laterally as shown in FIG. 3 between advanced and retracted positions by means of a control arm 37. Control arm 37 is pivoted at pivot pin 38 and formed with a slot 39 which engages a connecting pin 41 carried in the end of actuator 36.

Movement of arm 37 is activated by suitable means whose movement is represented by the line 45 of a type preferably having two stable states or positions. One stable position serves to dispose the arm at its advanced position and the other stable state serves to dispose arm 37 at a stable retracted position.

One leaf of actuator 36 includes a catch or pawl 42 for engaging a detent face **31*a*–34*a* whenever the actuator moves toward the right (FIG. 3), i.e., toward its advanced position. However, pawl 42 disengages the detent when moving toward its retracted position, i.e., toward the left. The other leaf of actuator 36 also includes a catch or pawl 43 for engaging one of detents 31*a*–34*a* when actuator 36 moves toward its retracted position and disengages the detent when moving toward its advanced position. In short, pawl 42 engages one of the detent faces 31*a*–34*a* whenever it is moving to the right and pawl 43 engages them when actuator 36** moves in the opposite direction.

As thus arranged, the leaves 36a each include a pawl disposed in confronting relation to the drive means and also to the detents located therein. The pawls are offset longitudinally of actuator 36 in position wherein a pawl on one of leaf members **36*a* will engage a detent and rotate star wheel 29 during movement of actuator 36** in one direction while a pawl on the other leaf member becomes disposed to engage a detent and continue rotation of the star wheel in the same direction during movement of the actuator in a reverse direction.

Thus, the pawls are disposed on opposite sides of the axis of rotation of star wheel 29 and offset slightly with respect to each other in order to provide the foregoing rotation function derived from reciprocating movement of actuator 36.

Figures 4A, 4B, 4C, 4D, 5:
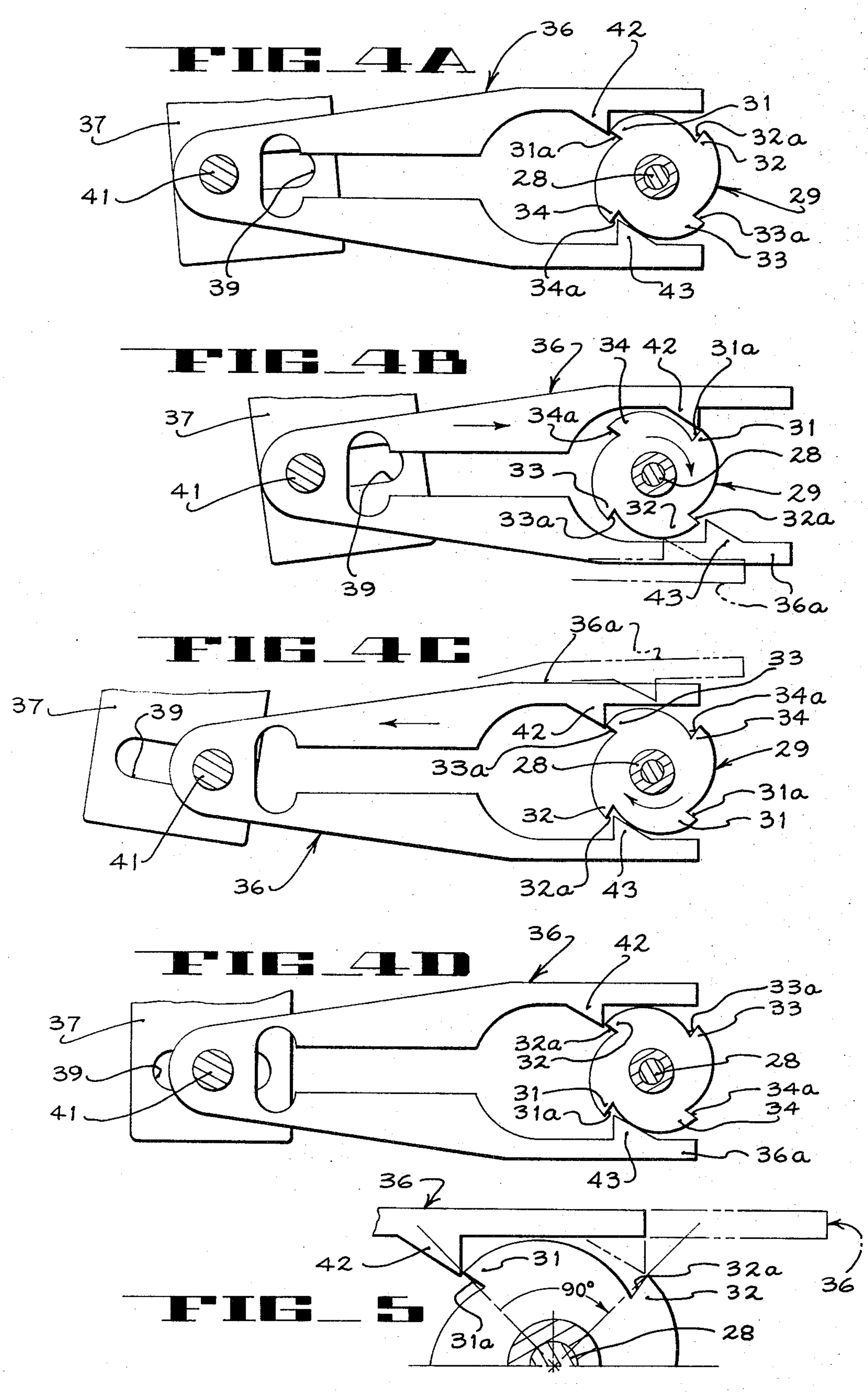
FIGS. 4A, 4B, 4C and 4D respectively show diagrammatically the steps in the sequence of operation of a head positioning means according to the invention.
FIG. 5 shows an enlarged diagram for explanation.

Operation of the apparatus is best understood by reference to FIGS. 4A–D wherein FIG. 4A shows the condition immediately following initial pivoting movement of control arm 37 but after taking up any slack in slot 39. Control arm 37 is then in driving engagement with connecting pin 41 so as to initiate movement of actuator 36 to the right. At this point in time, star wheel 29 will be disposed whereby detent 31a of lobe 31 barely engages the tip of pawl 42.

Rightward movement of control arm 37, as shown in FIG. 4B, serves to rotate star wheel 29 clockwise substantially 90°. In so doing (FIG. 4A) the smooth, curving cam portion (or back) of lobe 33 gradually springs the lower leaf **36*a* away from the axis of rotation of axle 28. This action permits detent 33*a* to be disposed just barely in the path of pawl 43** for later engagement.

Accordingly, by the foregoing quarter turn of star wheel 29, transducer slits 17, 18 of transducer 14 will be laterally transferred to another pair of tracks under action of cam 27 coupled to star wheel 29.

When it is desired to transfer slits 17, 18 of transducer 14 to a new pair of tracks, control arm 37 is merely moved leftwardly from the stable position shown in FIG. 4B. Thus, after the slack is taken from slot 39 (FIG. 4C), connecting pin 41 will engage the right hand wall of slot 39 and pawl 43 will engage detent 32a to further rotate star wheel 29 an additional quarter turn while the back of cam portion of lobe 34 (FIG. 4B) is gradually spreading the upper leaf 36a away from the axis of star wheel 29. Subsequently, (FIG. 4D) control arm 37 is returned to a mid position whereby detent 31a will have been moved substantially in two steps a total of 180° from its original or starting position and pawl 42 will be again merely in position to engage one of the detents, such as detent **33*a*.**

From the foregoing, it will be readily evident that arm 37 moves between advanced and retracted stable states or conditions to effect stepwise rotation of star wheel 29 whereby the flats **27*a* of face cam 27 provide highly accurate positioning of the transducer slits 17, 18 with respect to tape 12** while the mechanism has substantial tolerances.

I claim:

1. A positioning device for disposing a transducer to each of a series of transducing positions relative to a record medium wherein the positions each correspond to the position of a record track of the medium comprising a transducer support member movable between advanced and retracted positions for moving the transducer therewith between said transducing positions, a cam follower element carried by said support member, a cam rotatable to a plurality of discrete positions relative to said follower element to dispose said follower element for positioning the transducer in transducing relation to each of a number of transducing positions, drive means for rotating said cam, said drive means having a plurality of detents extending therefrom, an actuator, and enabling means coupled to the actuator, said actuator being movable between advanced and retracted stable positions for engaging one of said detents and rotating said drive means sufficiently during one stroke of said enabling means to cause movement of said actuator towards said advanced stable position to dispose said follower element to position the transducer in transducing relation with respect to one of said series of positions and engaging another of said detents to continue rotation of said drive means sufficiently during one stroke of said enabling means to cause reverse movement of said actuator towards said retracted stable position to dispose said follower element to position the transducer in transducing relation with respect to one of said series of positions to another one of said series of positions.

2. A positioning device according to claim 1 wherein said detents are further disposed on opposite sides of the axis of rotation of said drive means to rotate said cam in a common direction.

3. A positioning device according to claim 1 wherein said drive means further comprises a star wheel formed to include said plurality of detents extending outwardly from the periphery thereof.

4. A positioning device according to claim 1 wherein said actuator comprises an integral pair of spaced leaf members resiliently engaging said drive means therebetween, the leaves of said actuator each including a pawl formed thereon for engaging said detents and rotating said drive means during movement of said actuator between said advanced and retracted positions.

* * * * *